March 29, 1960     J. A. LINDELL     2,930,176
POWER EDGER AND TRIMMER
Filed Dec. 5, 1957     2 Sheets-Sheet 1
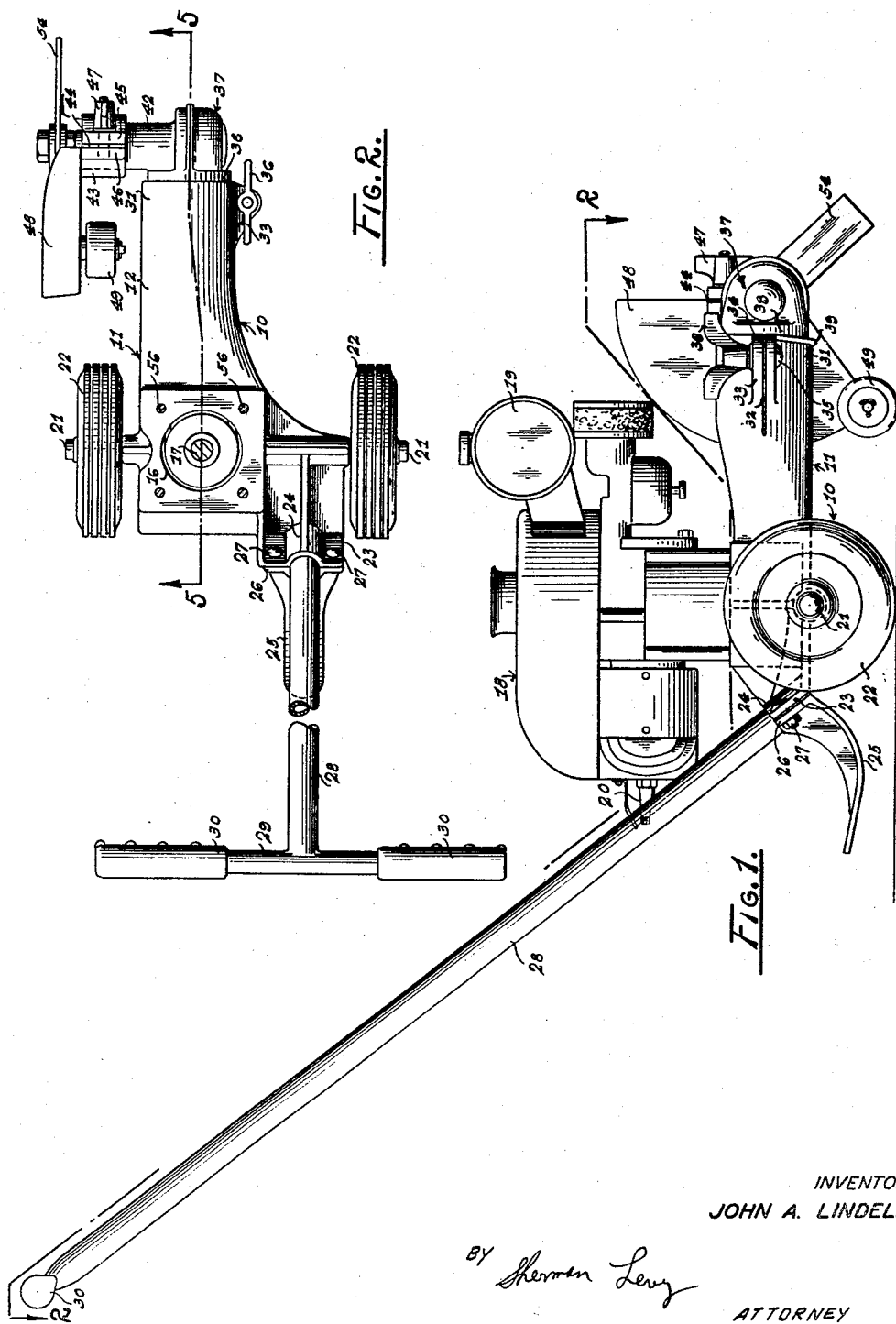
INVENTOR
JOHN A. LINDELL
BY
ATTORNEY

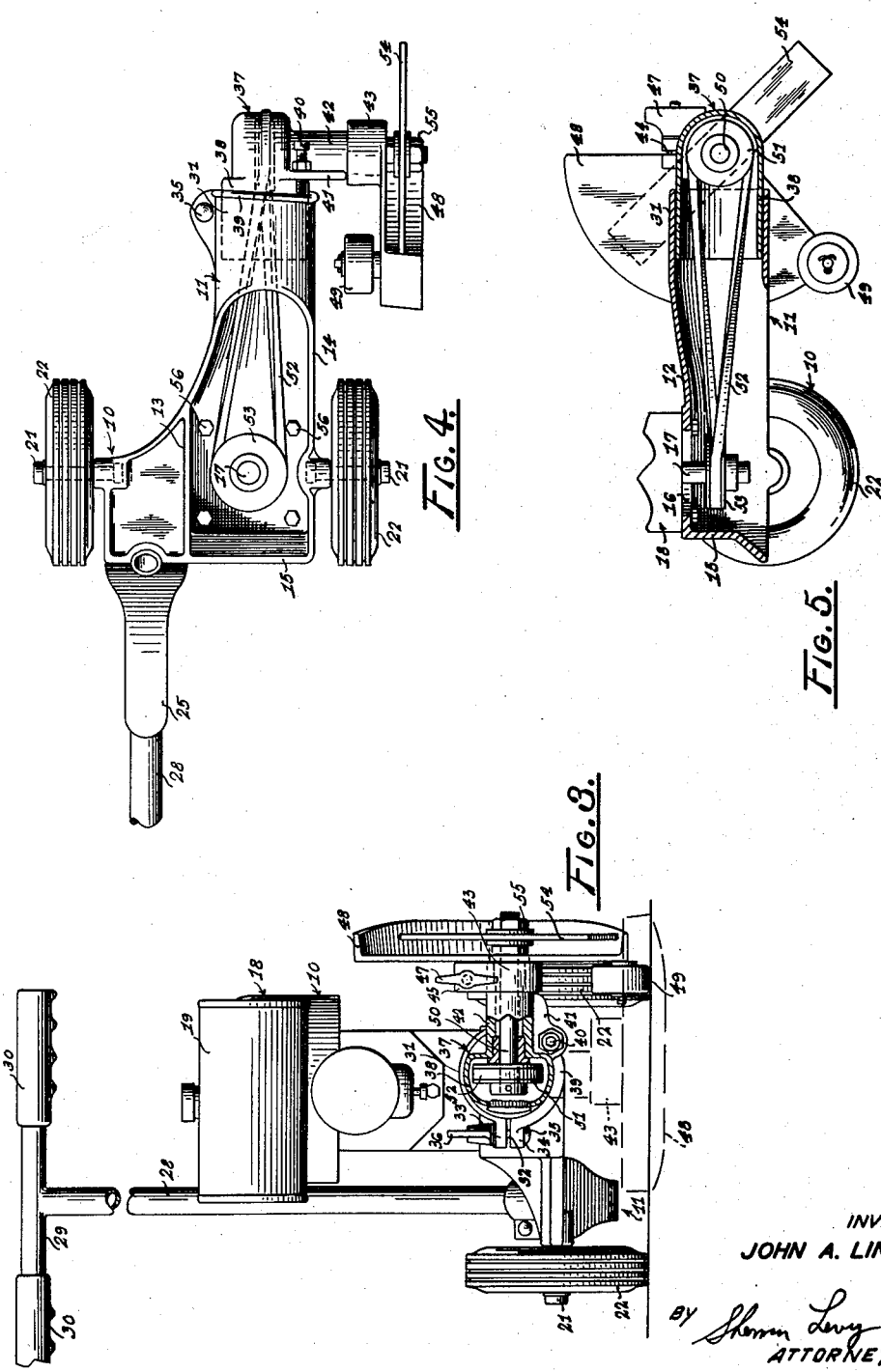

United States Patent Office 2,930,176
Patented Mar. 29, 1960

2,930,176

POWER EDGER AND TRIMMER

John A. Lindell, Fresno, Calif.

Application December 5, 1957, Serial No. 700,840

1 Claim. (Cl. 56—25.4)

This invention relates to a power edger and trimmer.

The object of the invention is to provide a power edger and trimmer which includes a novel drive mechanism, and wherein the position of the cutting blade can be adjusted as desired, the power edger and trimmer being ruggedly constructed and light in weight.

Another object of the invention is to provide a power edger and trimmer which includes a back skid or shoe for preventing reverse tipping of the machine, and wherein different types of engines or motors can be used for operating the machine, there being a novel mechanism for regulating the position of the rotary cutting blade.

A still further object of the invention is to provide a lawn working machine which includes a base that serves to support a motor or engine, and wherein the base is adapted to be made of light weight aluminum, there being a cutting blade operatably connected to the engine, and wherein the cutting blade can either be used in a vertical position as an edger or trimmer, or wherein the cutting blade can be moved or shifted to a horizontal position so that the machine can function as a lawn mower.

Another object of the invention is to provide a power edger and trimmer which includes a mounting frame or base that is ruggedly constructed and which has high structural stability and wherein the parts are made of a material such as aluminum which is not subject to corrosion, the base being hollow and having a drive belt arranged therein.

A further object of th einvention is to provide a power edger and trimmer which is extremely simple and inexpensive to manufacture.

Other objects and advantages will be apparent during the course of the following description.

In the accompanying drawings, forming a part of this application, and in which like numerals are used to designate like parts throughout the same:

Figure 1 is a side elevational view illustrating the power edger and trimmer of the present invention.

Figure 2 is a sectional view taken on the line 2—2 of Figure 1.

Figure 3 is a front elevational view of the power edger or trimmer, and with parts broken away and in section.

Figure 4 is a bottom view of the power edger and trimmer.

Figure 5 is a sectional view taken on the line 5—5 of Figure 2.

Referring in detail to the drawings, the numeral 10 indicates the power edger and trimmer of the present invention, and the edger and trimmer comprises a hollow base which is indicated generally by the numeral 11. As shown in Figure 5 for example, the base 11 includes a top wall 12, as well as spaced apart side walls 13 and 14, and a rear wall 15. The top wall 12 is provided with an opening 16, and a vertically disposed drive shaft 17 extends through the opening 16. The drive shaft 17 is operated by a conventional engine or motor 18, and the motor 18 includes the usual fuel tank 19, spark plug 20, and associated parts.

Extending outwardly from the sides of the base 11 and connected thereto is a pair of horizontally disposed axles 21, and ground engaging wheels 22 are mounted on the axles 21, Figure 4. A shown in Figure 2, there is provided a support member 23 which includes an intermediate curved section 24, and the numeral 25 designates an arcuate shoe or skid which is provided with a flange portion 26 that is secured to the support member 23 by suitable securing elements such as the bolt and nut assemblies 27. A handle bar 28 has its lower end secured in place between the flange 26 and arcuate section 24, and the bar 28 is provided with a crosspiece 29 on its upper end, there being hand grips 30 on the ends of the crosspiece 29.

As shown in the drawings, the front portion 31 of the base 11 has a substantially cylindrical shape, and the front end of the portion 31 is open. The front portion 31 is provided with a split portion 32, and spaced apart lugs 33 and 34 are arranged on opposite sides of the split portion 32. A securing element such as the bolt 35 extends through the lugs 33 and 34, and a wing nut 36 is arranged in threaded engagement with an end of the bolt 35. As shown in the drawings, the base 11 is hollow and the bottom of the base is open as shown in Figure 4.

The machine of the present invention further includes an adjustable head which is indicated generally by the numeral 37, and the head 37 includes a portion 38 which has a somewhat rounded formation, and the portion 38 is movably or adjustably mounted in the portion 31 of the base 11. A lip 39 is arranged on the lower front end of the base 11, and a screw member 40 extends through an apertured ear 41 on the head 37, an end of the screw member 40 engaging or abutting the lip 39.

The head 37 further includes a sleeve 42, and a collar 43 is adjustably connected to the sleeve 42. The collar 43 includes a split portion 44 which has spaced apart lugs 45 and 46 arranged contiguous thereto, Figure 2, and a bolt and nut assembly 47 connects the lugs 45 and 46 together.

Connected to the collar 43 is a guard 48 which carries a roller 49. The numeral 50 indicates a driven shaft which extends through the sleeve 42, and a pulley 51 is mounted on an end of the shaft 50. The numeral 52 indicates an endless belt which is trained over the pulley 51, and the belt 52 is also trained over a pulley 53 on the lower end of the drive shaft 17. The numeral 54 indicates a rotary cutting blade which is connected to an end of the shaft 50 by means of securing elements 55.

From the foregoing, it is apparent that there has been provided a power edger and trimmer and in use, it will be seen that the base 11 is hollow and is adapted to be made of a suitable lightweight material such as aluminum. The base 11 has the axle 21 connected thereto, and the ground engaging wheels 22 are mounted on the axles 21. The base 11 is shaped to include the front cylindrical portion 31 which serves to receive therein the portion 38 of the head 37. After the portion 38 is arranged in the proper position, the wing nut 36 is tightened on the bolt 35 whereby a clamping action is exerted through the lugs 33 and 34 so that the portion 38 will be maintained immobile in its proper position in the front end of the base 11. This adjustable arrangement of the portion 38 in the front end of the base 11 provides a means whereby tension on the belt 52 can be adjusted or tightened. For example, by loosening the wing nut 36, and properly rotating the screw member 40, it will be seen that the inner end of the screw member 40 will engage the lip 39 whereby the portion 38 can be urged outwardly with respect to the front end of the base 11 and this serves to provide a means for regulating or tightening the tension on the belt 52.

The motor or engine 18 is of conventional construction and may be secured to the top wall 12 of the base 11 by suitable securing elements 56. The motor 18 serves to drive the shaft 17, and the shaft 17 is vertically disposed and extends through the opening 16 in the top wall 12. The shaft 17 has a pulley 53 on its lower end, and the pulley 53 has the belt 52 trained thereover, the belt 52 being also trained over the pulley 51 which is connected to the shaft 50. The shaft 50 extends through the sleeve 42, and the rotary cutting blade 54 is connected to an end of the shaft 50. Thus, when the motor 18 is actuated, the cutting member 54 will be rotated whereby the machine can be conveniently used for edging or trimming operations, as for example when the cutting member 54 is rotating in a vertical plane, as for example as shown by solid lines in Figure 3. As shown in broken lines in Figure 3, the head 37 can be rotated or shifted 90 degrees whereby the cutting member 54 will rotate in a horizontal plane whereby weeds, grass and the like can be cut as the machine is moved along the ground. When the head 37 is to be turned to the position indicated by broken lines in Figure 3, the wing nut 36 can be loosened so as to permit rotation of the portion 38 in the front end 31 of the base 11, and after the head 37 has been moved to its desired position, the wing nut 36 is again tightened whereby accidental movement of the parts is prevented.

Furthermore, the collar 43 is adjustably mounted on an end of the sleeve 42, and the collar 43 includes the spaced apart lugs 45 and 46 which are connected together by the bolt and nut assembly 47. To adjust the collar 43, it is only necessary to loosen the bolt and nut assembly 47 whereby the collar 43 can be rotated or moved to the desired position on the sleeve 42 and then the bolt and nut assembly 47 can be tightened to lock the parts in their proper position. It is to be noted that the guard 48 is integral with or secured to the collar 43, so that as the collar 43 is adjusted, the guard 48 will be similarly adjusted, and the guard 48 carries the roller 49 which is adapted to engage the ground. The guard 48 insures that a machine can be operated more safely, since the guard 48 provides a shield for the rotating cutter 54.

The drive arrangement is such that the cutter will be rotated regardless of the position of the parts, so that the cutter will be rotated whether it is positioned in a vertical plane or a horizontal plane or the like so that the machine can be conveniently used as an edger and trimmer as well as a lawn mower, and weed cutter.

It is to be noted that the power edger and trimmer of the present invention includes parts such as the base which can be made of a suitable material such as cast aluminum, and the belt drive mechanism is completely housed within the base or housing. The motor uses a direct belt drive with a vertical shaft, and a large thumb screw is used for controlling the position of the blade. The main supporting wheels 22 are parallel under the engine 18, and depth control is maintained by means of the front roller 49 at a position adjacent the blade 54. The back skid 25 serves to prevent reverse tipping, and the machine is extremely light in comparison to other makes and models, and for example the machine may weigh in the neighborhood of 30 pounds. Any suitable engine or motor can be used for operating the machine, as for example a 2-cycle Clinton engine of 2-horsepower or a 4-cycle Briggs & Stratton 2-horsepower engine can be used, or a vertical shaft electric motor of at least one-third horsepower capacity can be used. By loosening the wing nut 36, and properly rotating the set screw 40, the tension on the belt 52 can be regulated, and as previously described, the rotating position of the blade head can be adjusted as desired.

It is to be noted that the machine of the present invention employs a rugged frame or base construction wherein the parts will be maintained in their proper aligned position and wherein the machine has high structural stability and the cast aluminum protects against corrosive elements. The castings may be normalized for permanent retention of precision machining.

It will be seen that the machine of the present invention will perform a variety of functions such as mowing and edging grass, and wherein adjustment of the parts is easily accomplished, and wherein the machine is ruggedly constructed so that it will withstand rough usage when working on lawns or the like.

Minor changes in shape, size and rearrangement of details coming within the field of invention claimed may be resorted to in actual practice, if desired.

What is claimed as new is as follows:

In a power edges and trimmer, a hollow base including a top wall and spaced apart side walls, said base further including a rear wall, there being an opening in the top wall of said base, a vertically disposed drive shaft extending through said opening, a motor supported on the rear portion of said base and secured to said top wall, axles extending outwardly from the sides of said base, ground engaging wheels connected to said axles, a support member on the rear of said base and said support member including an intermediate curved section, an arcuate shoe having a flanged portion secured to said support member, an inclined handle bar having its lower end secured between the flanged portion and the support member, said base including a front portion which is open and which has a substantially cylindrical shape, said front portion being provided with a split portion, spaced apart lugs adjacent said split portion, a securing element extending through said lugs, an adjustable head including a rounded portion movably mounted in the front portion of said base, a lip on the lower front end of said base, an apertured ear extended from said head, a screw member extending through said ear and engaging said lip, said head further including a cylindrical sleeve, a collar adjustably mounted on an end of said sleeve and said collar including spaced apart lugs, a securing element extending through said last named lugs, a guard connected to said collar, a roller connected to said guard, a driven shaft extending through said sleeve, a rotary cutting blade connected to an end of said driven shaft, pulleys on said drive and driven shaft, and an endless belt arranged in said base and trained over said pulleys.

References Cited in the file of this patent

UNITED STATES PATENTS

| 2,461,188 | Stoner | Feb. 8, 1949 |
| 2,597,017 | McKinstry | May 20, 1952 |
| 2,632,990 | Stricklen et al. | Mar. 31, 1953 |
| 2,680,945 | Reed | June 15, 1954 |
| 2,719,400 | Lesesne | Oct. 4, 1955 |
| 2,720,071 | Watanabe | Oct. 11, 1955 |
| 2,854,804 | Scott | Oct. 7, 1958 |